US008355566B2

(12) United States Patent
Ng

(10) Patent No.: US 8,355,566 B2
(45) Date of Patent: Jan. 15, 2013

(54) METHOD AND DEVICE FOR USE IN CONVERTING A COLOUR IMAGE INTO A GRAYSCALE IMAGE

(75) Inventor: Michael K. P. Ng, Kowloon Tong (HK)

(73) Assignee: Hong Kong Baptist University, Kowloon (HK)

( * ) Notice: Subject to any disclaimer, the term of this patent is extended or adjusted under 35 U.S.C. 154(b) by 957 days.

(21) Appl. No.: 12/385,289

(22) Filed: Apr. 3, 2009

(65) Prior Publication Data

US 2010/0254601 A1 Oct. 7, 2010

(51) Int. Cl.
*G06K 9/00* (2006.01)

(52) U.S. Cl. ........ 382/162; 382/167; 382/163; 382/172; 382/275; 382/260; 348/645; 348/630; 348/E9.053; 348/E9.042

(58) Field of Classification Search ............... 382/164, 382/162, 163, 165, 167, 172; 358/1.9, 516, 358/2.1, 3.01, 518; 348/645, 630, E9.053, 348/450, E9.042, 234

See application file for complete search history.

(56) References Cited

U.S. PATENT DOCUMENTS

| | | | | |
|---|---|---|---|---|
| 6,757,426 B2 * | 6/2004 | Link et al. | | 382/163 |
| 7,885,457 B2 * | 2/2011 | Hirano et al. | | 382/162 |
| 2006/0290957 A1 * | 12/2006 | Kim et al. | | 358/1.9 |
| 2007/0031031 A1 * | 2/2007 | Hirano et al. | | 382/167 |
| 2007/0200811 A1 * | 8/2007 | So | | 345/89 |

OTHER PUBLICATIONS

Qiu, Min, et al., "Contrast Maximizing and Brightness Preserving Color to Grayscale Image Conversion," *CGIV 2008, IS&T's Fourth European Conference on Colour in Graphics, Imaging and Vision 10th International Symposium on Multispectral Colour Science*, Jun. 9-13, 2008, 5 pages, Terrassa-Barcelona, Esparia.
Grundland, et al., "Decolorize: Fast, contrast enhancing, color to grayscale conversion," *Pattern Recognition*, 2007, pp. 2891-2896, vol. 40, Elsevier Ltd.
Gooch, Amy, et al., "Color2Gray: Salience-Preserving Color Removal," pp. 1-6, http://www.cs.northwestern.edu/~ago820/color2gray/color2gray.pdf.
Rasche, Karl, et al., "Re-coloring Images for Gamuts of Lower Dimension,"*Eurographics*, 2005, 10 pages, vol. 24, No. 3, Blackwell Publishing, Oxford, England and Malden, MA.

* cited by examiner

*Primary Examiner* — Mekonen Bekele
(74) *Attorney, Agent, or Firm* — Buchanan Ingersoll & Rooney PC

(57) ABSTRACT

A computerized device for converting a color image data, indicative of a plurality of color image regions defining a two-dimensional color image, into a grayscale image data indicative of a plurality of grayscale image regions defining a two-dimensional grayscale image, with each of the color image regions corresponding to one of the grayscale image regions. A luminance information and a two-dimensional chromatic information is associated with each of the color image regions. The device includes a processor and a memory store. The memory store is adapted to store a program executable by the processor so as to perform the following steps: determining a principal chromatic component of each of the color image regions; determining a first correlation value; and generating the grayscale image data by reference to the first correlation value.

14 Claims, 13 Drawing Sheets

(9 of 13 Drawing Sheet(s) Filed in Color)

| Regions | Luminance | C2GBO-1 | Decolorize | CLPC Method |
|---|---|---|---|---|
| Red Fruit 1 (dark) | 142.3 | 214.5 | 210.2 | 106.1 |
| Red Fruit 2 (blright) | 51.2 | 113.6 | 111.8 | 39.8 |
| Green Leaf | 160.3 | 127.8 | 132.5 | 195 |
| Absolute Differences | Luminance | C2GBO-1 | Decolorize | CLPC Method |
| Red Fruit 1 and Red Fruit 2 | 91.1 | 100.9 | 98.4 | 66.3 |
| Red Fruit 1 and Green Leaf | 18 | 86.7 | 77.7 | 88.9 |
| Red Fruit 2 and Green Leaf | 109.1 | 14.2 | 20.7 | 155.2 |

FIG. 9(f)

METHOD AND DEVICE FOR USE IN CONVERTING A COLOUR IMAGE INTO A GRAYSCALE IMAGE

TECHNICAL FIELD

The present invention relates to at least a method and device for converting a colour image to a grayscale image. In particular, the present invention relates to a method and device for converting a colour image to a grayscale image for printing upon a grayscale printer.

BACKGROUND OF THE INVENTION

Certain pre-existing conversion algorithms used in converting a colour image into a grayscale image involve creating the grayscale image by reference to only the luminance values of pixels within the colour image.

However, in many instances, the colour image will contain isoluminant regions such that visual contrasts which are readily visible in the colour image may not be readily visible or distinguishable in the resulting grayscale image.

Other pre-existing algorithms tend to employ multidimensional scaling to covert a colour image to a grayscale image. However, such processes tend to involve the processing of relatively large numbers of variables which is time and resource intensive and therefore unsuitable for use real-time applications such as printing.

Examples of such pre-existing colour image conversion algorithms are described in the following cited publications:
(i) Contrast Maximizing and Brightness Preserving Colour to Grayscale Image Conversion, CGIV 2008, IS&T's Fourth European Conference on Colour in Graphics, Imaging and Vision 10th International Symposium on Multispectral Colour Science, Jun. 9-13 2008, Terrassa-Barcelona, Esparia, by M Qiu, G. Finlayson and G. Qiu. (hereafter referred to as the "C2GB0-1" algorithm); and
(ii) The Decolorize Algorithm for Contrast Enhancing, Color to Grayscale Conversion, Pattern Recognition, V40 (2007), pp. 2891-2896). By M. Grundland and N. Dodgson (hereafter referred to as the "Decolorize" algorithm).

SUMMARY OF THE INVENTION

The present invention seeks to alleviate at least one of the problems described above in relation to the prior art.

The present invention may involve several broad forms. Embodiments of the present invention may include one or any combination of the different broad forms herein described.

In a first broad form, the present invention provides a method for use in converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, the method including the steps of:
(i) determining a principal chromatic component of each of the colour image regions by reference to the two-dimensional chromatic information associated with each of the colour image regions;
(ii) determining a first correlation value indicative of a correlation between the collective principal chromatic components of the colour image regions and the collective luminance informations of the colour image regions; and
(iii) generating the grayscale image data by reference to the first correlation value, wherein:
   (a) if the first correlation value is equal to or greater than zero, a grayscale value is generated for each grayscale image region by adding the principal chromatic component to the luminance information associated with the corresponding colour image region; and
   (b) if the first correlation value is less than zero, a grayscale value is generated for each grayscale image region by subtracting the principal chromatic component from the luminance information associated with the corresponding colour image region.

Preferably, the luminance information and two-dimensional chromatic information associated with each of the colour image regions are represented in accordance with the CIELAB colour space standard.

Preferably the principal chromatic component of each colour image region may include the first principal chromatic component of each colour image region.

Preferably, the step of determining the principal chromatic components of the colour image regions includes applying a linear transformation to first and second chromatic components of the two-dimensional chromatic information of each of the colour regions.

Typically, the first principal component $C_i$ determined from the two dimensional chromatic information of each colour image region may be determined by reference to the following equation:

$$C_i = \alpha_1 a_i^* + \alpha_2 b_i^*,$$

where $(a_i^*, b_i^*)$ represents the pair of the first and second chromatic components of the colour image data, and $\alpha_1^2 + \alpha_2^2 = 1$.

Preferably, the present invention includes a further step of normalising the grayscale image data.

In a second broad form, the present invention provides a computerised device for converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, wherein the device includes a processor and a memory store, said memory store being adapted to store a program executable by the processor so as to perform the following method steps:
(i) determining a principal chromatic component of each of the colour image regions by reference to the two-dimensional chromatic information associated with each of the colour image regions;
(ii) determining a first correlation value indicative of a correlation between the collective principal chromatic components of the colour image regions and the collective luminance informations of the colour image regions; and
(iii) generating the grayscale image data by reference to the first correlation value, wherein:
   (a) if the first correlation value is equal to or greater than zero, a grayscale value is generated for each grayscale image region by adding the principal chromatic component to the luminance information associated with the corresponding colour image region; and
   (b) if the first correlation value is less than zero, a grayscale value is generated for each grayscale image region by subtracting the principal chromatic component from the luminance information associated with the corresponding colour image region.

Typically, the computerised device may include at least one of a printer, a personal computer, a PDA, a USB device, a dongle, a photocopier, a scanner, a facsimile machine, and a combination thereof.

In a third broad form, the present invention provides a computer-readable medium adapted for storing a computer program executable by a computerised system so as to perform the method steps in accordance with the first broad form of the present invention.

In a fourth broad form, the present invention provides a method for use in converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, the method including the steps of:

(i) determining a principal chromatic component of each of the colour image regions by reference to the two-dimensional chromatic information associated with each of the colour image regions;
(ii) determining a first correlation value indicative of a correlation between the collective principal chromatic components of the colour image regions and the collective luminance informations of the colour image regions;
(iii) determining a second correlation value indicative of a correlation between the collective principal chromatic components of the colour image regions and the collective first chromatic components of the two dimensional chromatic informations of the colour image regions;
(iv) determining a third correlation value indicative of a correlation between the collective principal chromatic components of the colour image regions and the collective second chromatic components of the two dimensional chromatic informations of the colour image regions; and
(v) generating the grayscale image data by reference to the first, second and third correlation value, wherein:
  (a) if at least one of the first, second, and third correlation values is equal to or greater than zero, a grayscale value is generated for each grayscale image region by adding the principal chromatic component to the luminance information associated with the corresponding colour image region; and
  (b) if all of the first, second and third correlation values are less than zero, a grayscale value is generated for each grayscale image region by subtracting the principal chromatic component from the luminance information associated with the corresponding colour image region.

In a fifth broad form, the present invention provides a computerised device for converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, wherein the device includes a processor and a memory store, said memory store being adapted to store a program executable by the processor so as to perform the following method steps:

(i) determining a principal chromatic component of each of the colour image regions by reference to the two-dimensional chromatic information associated with each of the colour image regions;
(ii) determining a first correlation value indicative of a correlation between the collective principal chromatic components of the colour image regions and the collective luminance informations of the colour image regions;
(iii) determining a second correlation value indicative of a correlation between the collective principal chromatic components of the colour image regions and the collective first chromatic components of the two dimensional chromatic informations of the colour image regions;
(iv) determining a third correlation value indicative of a correlation between the collective principal chromatic components of the colour image regions and the collective second chromatic components of the two dimensional chromatic informations of the colour image regions; and
(v) generating the grayscale image data by reference to the first, second and third correlation value, wherein:
  (a) if at least one of the first, second, and third correlation values is equal to or greater than zero, a grayscale value is generated for each grayscale image region by adding the principal chromatic component to the luminance information associated with the corresponding colour image region; and
  (b) if all of the first, second and third correlation values are less than zero, a grayscale value is generated for each grayscale image region by subtracting the principal chromatic component from the luminance information associated with the corresponding colour image region.

BRIEF DESCRIPTION OF THE DRAWINGS

The application file contains at least one drawing executed in color. Copies of this patent or patent application publication with color drawings will be provided by the Office upon request and payment of the necessary fees.

The present invention will become more fully understood from the following detailed description of a preferred but non-limiting embodiment thereof, described in connection with the accompanying drawings, wherein:

FIG. 9(f) shows a table comparatively illustrating the absolute grayscale values contrasts in resulting grayscale images produced by each of the first embodiment "CLPC" algorithm, the pre-existing "C2GB0-1" conversion algorithm, and the pre-existing "Decolorize" conversion algorithm;

MODES FOR CARRYING OUT THE INVENTION

Preferred embodiments of the present invention will now be described herein with reference to FIGS. 1(a)-10(e).

Figure 1A:
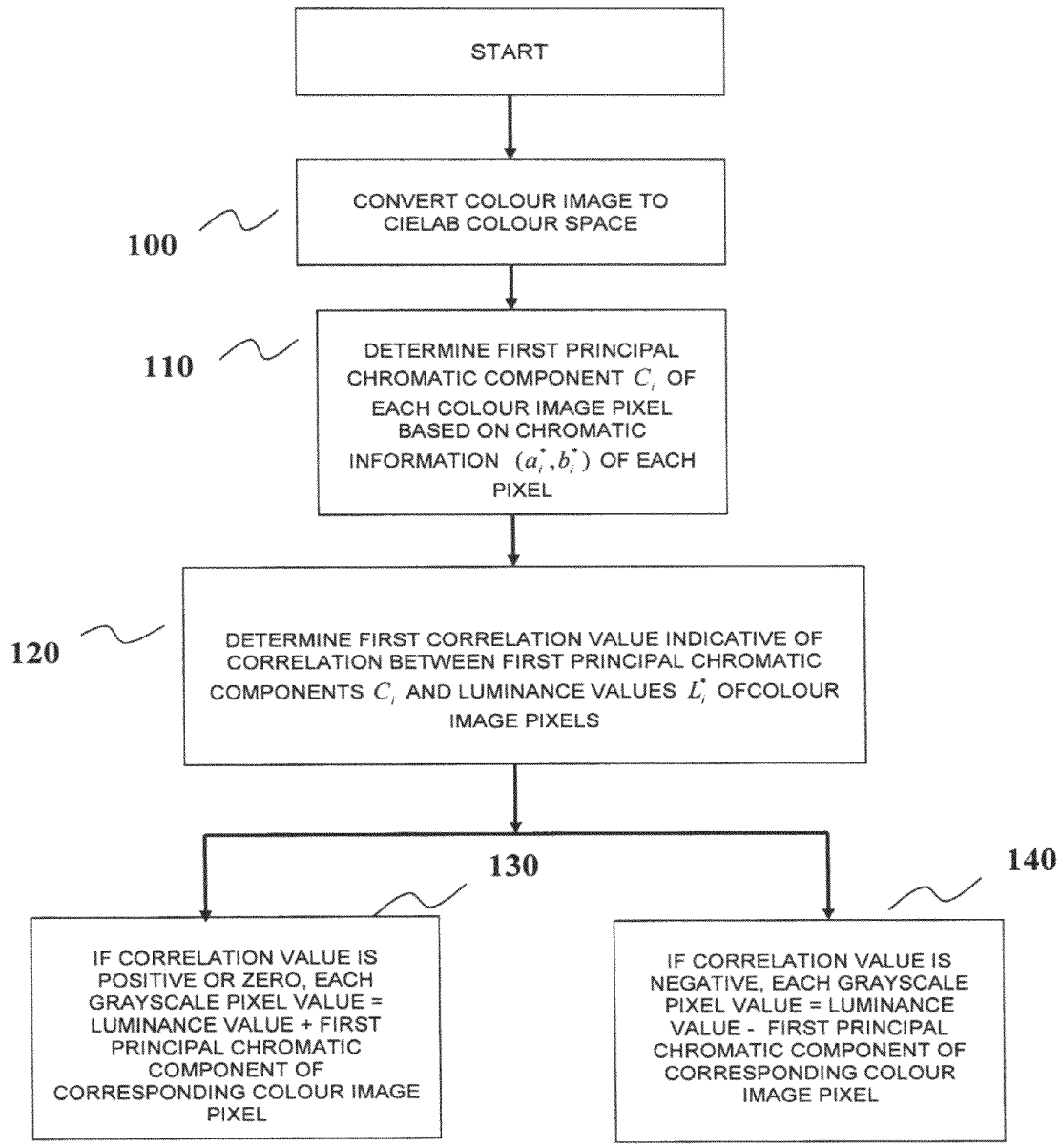
FIG. 1(a) shows a flow-diagram representing steps of a first embodiment method for converting a colour image into a grayscale image.

The method steps of a first embodiment are shown represented by blocks (100)-(140) in the flowchart of FIG. 1(a) where the method steps are able to be performed by executable software running upon a computerised device. The first embodiment method is referred to as the "CLPC" algorithm.

Figure 2:
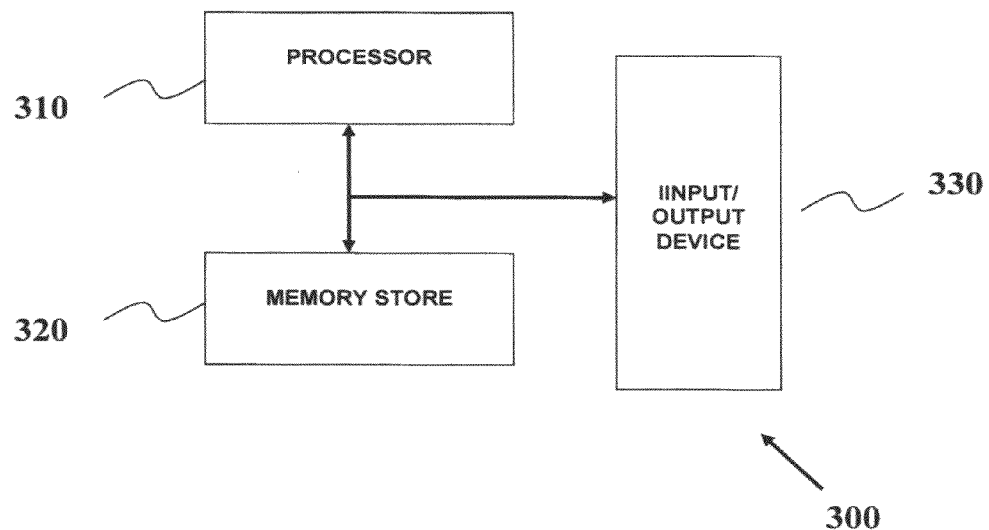
FIG. 2 shows a schematic diagram of a computerised device for performing the method steps in accordance with embodiments of the present invention.

A schematic diagram of a second embodiment computerised device (300) for performing the method steps of the first embodiment is shown in FIG. 2. The computerised device (300) includes a processor (310), a memory store (320) and an input/output interface (330). For instance, the computerised device (300) could be implemented by way of a desktop or laptop computer, a PDA, a printer, a photocopier, a scanner, a facsimile device, a USB device, a dongle, or any combination thereof.

The colour image to be converted to the grayscale image is defined by a two-dimensional array of pixels. The grayscale image to be generated by reference to the colour image is also defined by a two-dimensional array of grayscale image pixels. Each of the grayscale image pixels corresponds with one of the colour image pixels and the grayscale image pixel values are generated by reference to data properties of the corresponding colour image pixels.

Figure 3A:
FIG. 3(a) shows a first exemplary colour image to be converted into a grayscale image using the method steps of embodiments of the present invention.

Typically, the colour image such as is shown in FIG. 3(a) may initially be represented by colour image data conforming to the RGB colour space. Accordingly, the colour image data is converted from the RGB colour space into the CIELAB colour space in order readily identify the luminance components $L_i^*$ and first and second chromatic components $(a_i^*, b_i^*)$ of each colour image pixel. This step is represented by block (100) in FIG. 1(a).

Figure 3B:
FIG. 3(b) shows a grayscale image which has been generated by a pre-existing conversion algorithm in which only the luminance information of pixels defining the first colour image of FIG. 3(a) are used.
Figure 3C:
FIG. 3(c) shows a grayscale image comprising only the first principal chromatic components of colour image pixels defining the first colour image in FIG. 3(a)
Figure 3D:
FIG. 3(d) shows a grayscale image comprising only the negative values of first principal chromatic components of the colour image pixels defining the first colour image in FIG. 3(a)

FIG. 3(b) shows a grayscale image comprising only the luminance components of the colour image pixels in FIG. 3(a).

Thereafter, as represented by block (110) in FIG. 1(a), principal component analysis is applied to the two chromatic components of each colour image pixel to determine a first principal chromatic component $C_i$ of each colour image pixel. That is, a linear transformation is applied by principal component analysis in accordance with the following equation:

$$C_i = \alpha_1 a_i^* + \alpha_2 b_i^*,$$

where $\alpha_1^2 + \alpha_2^2 = 1$.

Figure 4:
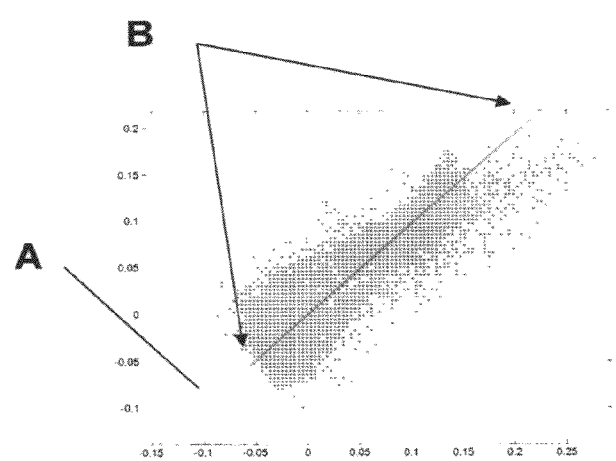
FIG. 4 shows data points representing the first and second chromatic components of the colour image pixels in FIG. 3(a) plotted in a two dimensional plane with an arrow representing the direction of the first principal chromatic components.

FIG. 4 shows the chromatic values $(a_i^*, b_i^*)$ of the colour image pixels are shown plotted as data points. The large arrow indicated by "A" represents the direction of the first principal chromatic components and the region indicated by "B" represents the first principal chromatic components $C_i$ of the colour image pixels. It would be understood by a person skilled in the art that the large arrow "A" represents the direction along which the chromatic values of the colour image pixels exhibit the largest variation.

Figure 5A:
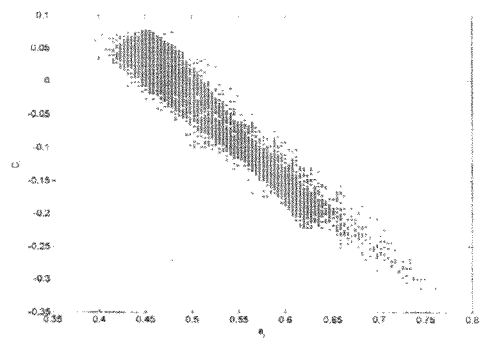
FIG. 5(a) shows first chromatic components of the colour image pixels of FIG. 3(a) plotted against the respective first principal chromatic components of the colour image pixels wherein further analysis determines a negative second correlation value.
Figure 5B:
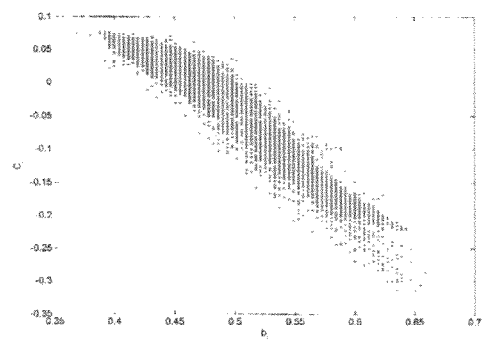
FIG. 5(b) shows the second chromatic components of the colour image pixels of FIG. 3(a) plotted against the respective first principal chromatic components of the colour image pixels wherein further analysis determines a negative third correlation value.
Figure 5C:
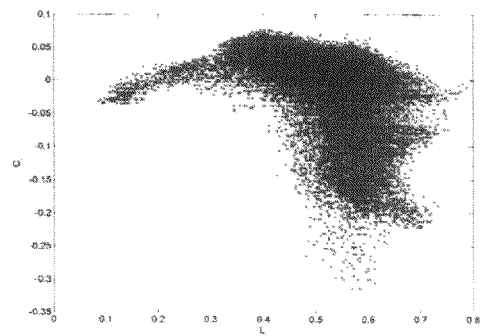
FIG. 5(c) shows the luminance components of the colour image pixels of FIG. 3(a) plotted against the first principal chromatic components of the colour image pixels wherein further analysis determines a negative first correlation value.

FIG. 5(c) shows luminance values plotted against the respective first principal chromatic components of colour image pixels of the FIG. 3(a). A correlation is performed between the collective set of first principal chromatic components of the colour image pixels against the collective set of luminance values of the colour image pixels so as to produce a first correlation value. This step is represented by block (120) in FIG. 1(a).

Thereafter, a transformation is applied to the data representing the colour image pixels by reference to the resulting first correlation value so as to convert the colour image data into grayscale image data. Advantageously, the transformation (as described in further detail below) results in a grayscale image which exhibits maximal differences i.e. high contrast. That is, the transformation is based on the principle that when two signals are positively correlated, adding one signal to the other results in a higher contrast signal, and, if two signals are negatively correlated, then subtracting one signal from the other will also lead to a higher contrast. Hence this may assist in overcoming the problem with pre-existing conversion processes in which isoluminant regions of the colour image become substantially invisible within the resulting grayscale image.

Accordingly, the transformation operates such that where the resulting first correlation value indicates a positive correlation or a correlation of zero, each grayscale pixel of the grayscale image is assigned a grayscale value based on the addition of $L_i^*$ and $C_i$ of the corresponding colour image pixel. This step is represented by block (130) in FIG. 1(a). Alternatively, where the resulting correlation value indicates a negative correlation, then each grayscale pixel of the grayscale image is assigned a grayscale value based on the subtraction of $C_i$ from of $L_i^*$ and of the respective corresponding colour image pixel. This alternative step is represented by block (140) in FIG. 1(a). The grayscale image data is then normalised.

Figure 3E:
FIG. 3(e) shows, for illustrative purposes only, a grayscale image having grayscale image pixel values based on the addition of the first principal chromatic components to the luminance components of corresponding colour image pixels—in this case, the resulting grayscale image contrast is not optimal as the correlation value between the luminance components and first principal chromatic components of the colour pixels is negative instead of positive.
Figure 3F:
FIG. 3(f) shows a grayscale image generated from the first colour image in FIG. 3(a) in accordance with the first embodiment where first principal chromatic components of the colour image data have been subtracted from the luminance values to produce a relatively improved grayscale image contrast in view of the determine negative correlation between the luminance components and first principal chromatic components of the colour image pixels.

FIGS. (3c) and 3(d) show images comprising only the $C_i$ and $-C_i$ of colour image pixels in the colour image of FIG. 3(a) respectively. In this example, the correlation between the first principal chromatic components and luminance components of the colour image pixels produces a negative correlation value. Accordingly, FIG. 3(f) shows the resulting optimal grayscale image which is generated by this embodiment whereby the grayscale pixel values are formed by subtracting the first principal chromatic components of the corresponding colour image pixels from the luminance components of the corresponding colour image pixels (ie. the data of FIG. 3(b) is combined with the data of FIG. 3(d)). It would be readily apparent that a relatively improved contrast in grayscale values is provided. For reference purposes only, FIG. 3(e) shows a grayscale image in which its grayscale pixel values are formed by adding the $C_i$ of the corresponding colour image pixels to the luminance components of their corresponding colour image pixels (i.e. the data of FIG. 3(b) is combined with the data of FIG. 3(d)). This is because the first correlation value between the luminance components and the first principal chromatic components in this case was determined to be negative.

In alternative embodiments of the present invention, the determination of the grayscale value for each grayscale image pixel is determined by reference to three different correlation values. That is, in addition to the first correlation value described above, a second and third correlation value is also determined, based upon:
 (i) a correlation between the set of first principal chromatic components and the set of first chromatic components $a_i$ of the colour image pixels; and
 (ii) a correlation between the set of first principal chromatic components and the set of second chromatic components $b_i$ of the colour image pixels.

FIG. 5(a) shows the first chromatic components of the colour image pixels plotted against the respective first principal chromatic components of the colour image pixels defining the colour image in FIG. 3(a). Similarly, FIG. 5(b) shows the second chromatic components plotted against the respective first principal chromatic components of the colour image pixels defining the colour image in FIG. 3(a). An analysis of the second and third correlation values by reference to the plotted charts reveals that they are also both negative, as in the case of the previously determined first correlation value between the luminance components and the first principal chromatic components.

Figure 1B:
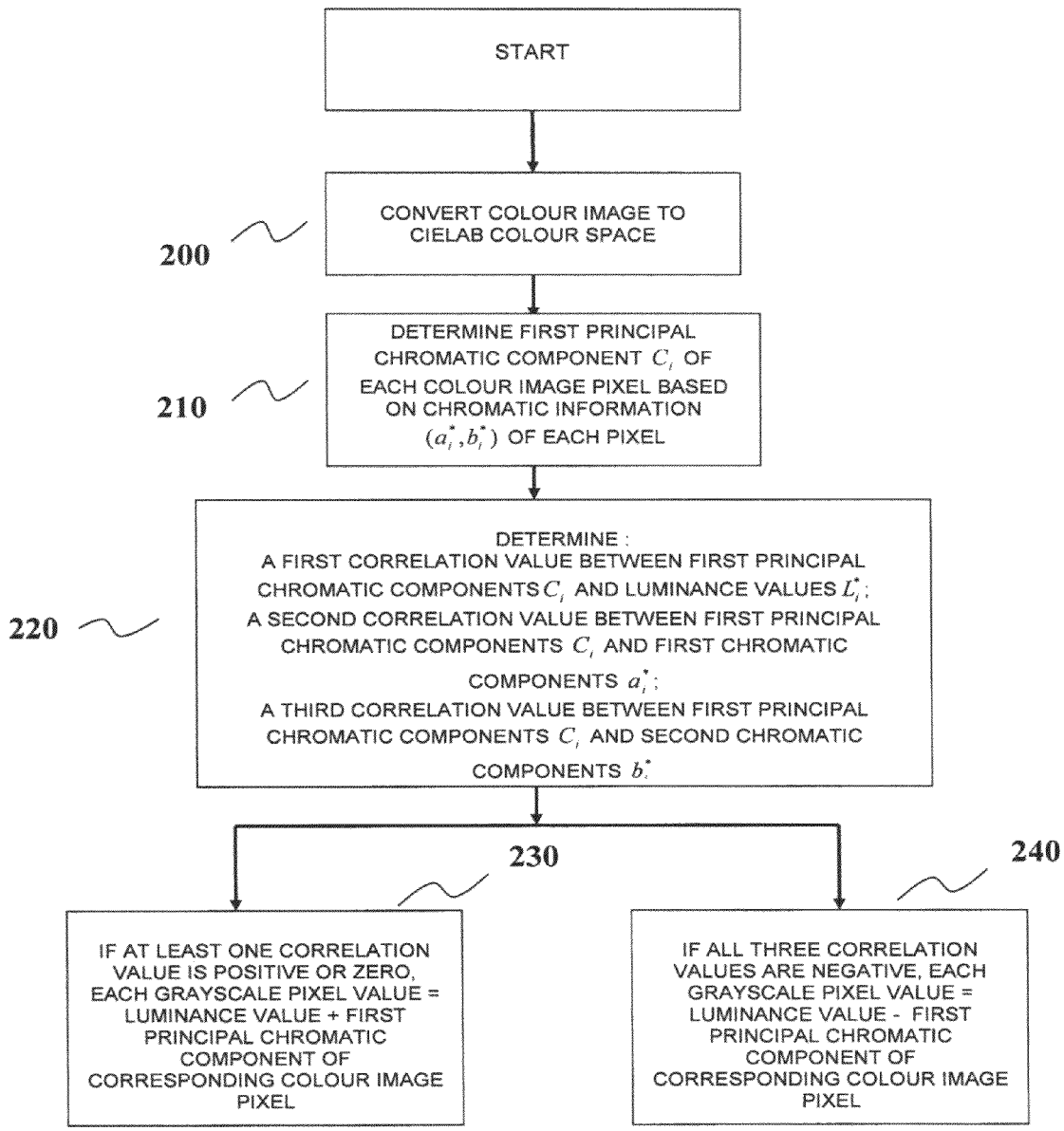
FIG. 1(b) shows a flow-diagram representing steps of a method of converting a colour image into a grayscale image according to another embodiment.

Upon determining the first, second and third correlation values, if at least one of the first, second and third correlation values are equal to or greater than zero, then the grayscale value of each grayscale image pixel is determined by adding the luminance component and first principal chromatic component of the corresponding colour image pixel. Alternatively, if at least one of the first, second and third correlation values is less than zero, then the grayscale value of each grayscale image pixel is determined by subtracting the first principal chromatic component from the luminance component of the corresponding colour image pixel. FIG. 1(b)

shows blocks (200)-(240) of a flowchart representing the modification of the first embodiment method steps.

Referring to the first exemplary colour image of FIG. 3(a) once again, it would be apparent that, when taking into account three correlation values, the grayscale pixel values would still be generated by subtracting the first principal chromatic components from the luminance components of the corresponding colour image pixels given that none of the correlation values are positive.

In yet alternative embodiments of the present invention, grayscale image pixels may be generated by reference to any one of the first, second or third correlation values in isolation. Alternatively, the grayscale images may be generated by reference to any two of the first, second or third correlation values in isolation. For instance, if only the first and the third correlation values are to be used as a reference for generating grayscale pixel values, then, if at least one of the first and third correlation values are equal to or greater than zero, then the grayscale pixel value for each grayscale image pixel is assigned a grayscale value corresponding to the addition of the luminance component and first principal chromatic component of the corresponding colour image pixel. Similarly, if both of the first and third correlation values are less than zero, then the grayscale pixel value for each grayscale image pixel is assigned a grayscale image value corresponding to the luminance component minus the first principal chromatic component of the corresponding colour image pixel.

Further comparisons between the performance characteristics of the first embodiment "CLPC" algorithm against the cited "C2GB0-1" and "Decolorize" algorithms will be discussed in the further examples below for the purpose of highlighting the advantages of the first embodiment CLPC algorithm.

EXAMPLE I

Figure 6A:
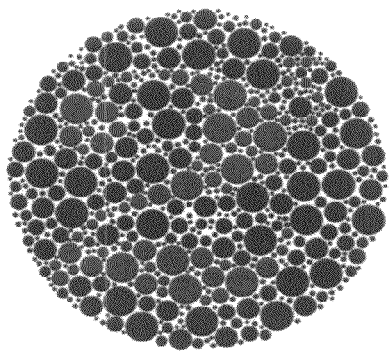
FIG. 6(a) shows a second exemplary colour image.

FIG. 6(a) shows a second colour image which is to be converted into a grayscale image using the CLPC algorithm, the Decolorize algorithm and the C2GB0-1 algorithm for the purposes of illustrating the performance enhancement of the CLPC algorithm.

In converting the colour image into a grayscale image, it is desirable to provide a high contrast between the numbers "2" and "5" relative to the background.

Figure 6B:
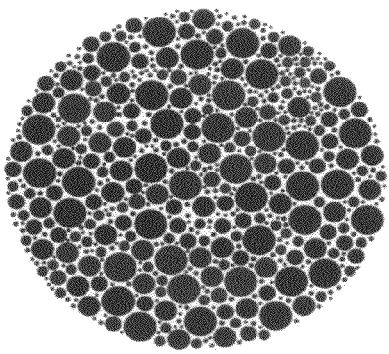
FIG. 6(b) shows an image generated based upon only the luminance components of the colour image pixels in FIG. 6(a)

FIG. 6(b) shows a grayscale image which may be typically generated by pre-existing image conversion algorithms in which only the luminance values of each colour image pixel is used to form the grayscale image. It would be readily apparent to a person skilled in that art that the numbers "2" and "5" in FIG. 6(b) are not suitably defined and poorly contrasted.

Figure 6C:
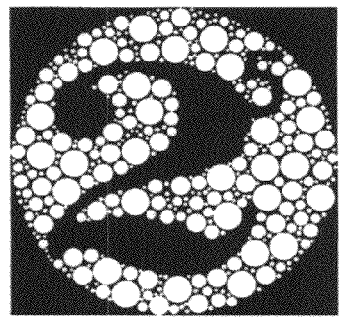
FIG. 6(c) shows an image generated based upon only the $C_i$ of the colour image pixels of FIG. 6(a)
Figure 6D:
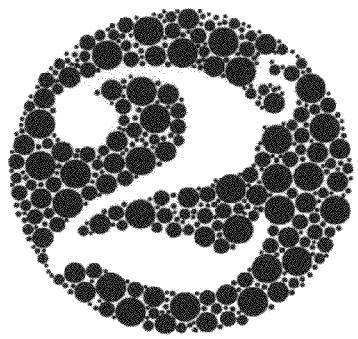
FIG. 6(d) shows an image generated based upon only the $-C_i$ of the colour image pixels of FIG. 6(a)
Figure 6E:
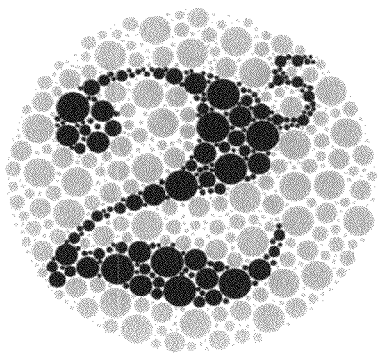
FIG. 6(e) shows a grayscale image properly generated in accordance with the an embodiment of the present invention in which the grayscale image pixel values are based on the addition of the luminance components and first principal chromatic components of their corresponding colour image pixels, in view of a finding of at least one positive correlation value (that is, between the luminance components and first principal chromatic components of the colour image pixels in FIG. 6(a))
Figure 6F:
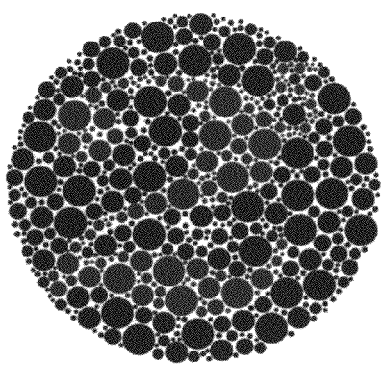
FIG. 6(f) shows, for reference purposes only, a grayscale image in which the grayscale image pixel values are based on the subtraction of the first principal chromatic components from the luminance components of their corresponding colour image pixels—the resulting grayscale image is not optimally contrasted in this case given that at least one positive correlation value has been determined.
Figure 6G:
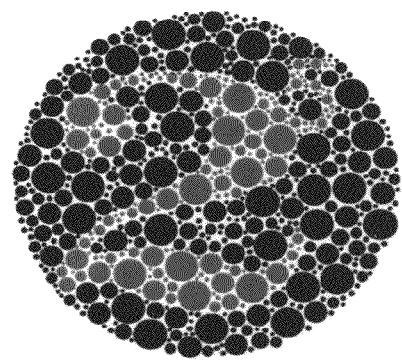
FIG. 6(g) shows a relatively poorly contrasted grayscale image generated by application of a pre-existing "C2GB0-1" conversion algorithm.
Figure 6H:
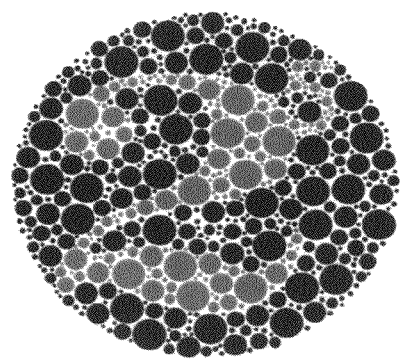
FIG. 6(h) shows a relatively poorly contrasted grayscale image generated by application of a pre-existing "Decolorize" conversion algorithm.

The grayscale images shown in FIGS. 6(g) and 6(h) which have been produced using the C2GB0-1 and Decolorize conversion algorithms respectively exhibit relatively poor contrasts between the numbers "2" and "5" and the background. Notably, the absolute difference in grayscale values that are achieved between the numbers "2" and "5" and the backgrounds in FIGS. 6(g) and 6(h) are only 107 and 88 respectively.

Figure 7:
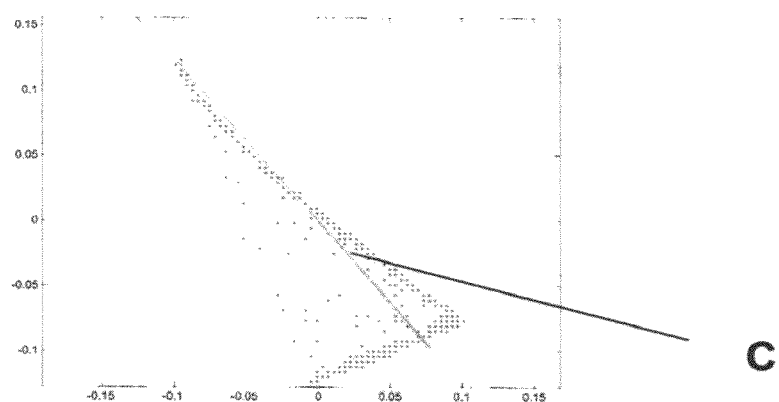
FIG. 7 shows the first and second chromatic components of the colour image in FIG. 6(a) plotted as data points, and an arrow representing the direction of the first principal chromatic components.

FIG. 7 shows data points representing the chromatic values $(a_i^*, b_i^*)$ plotted in a chromatic plane of the colour image pixels. The arrow "C" represents the direction of the first principal chromatic components of the pixels. FIG. 6(c) shows an image which has been generated based upon only the $C_i$ of the colour image pixels. FIG. 6(c) shows an image which has been generated based upon only the $-C_i$ of the colour image pixels.

Figure 8A:
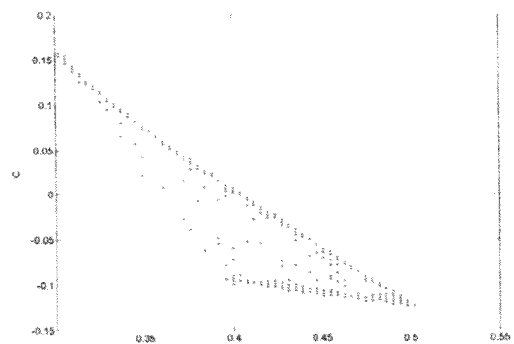
FIG. 8(a) shows first chromatic components of colour image pixels in FIG. 6(a) plotted against the first principal chromatic components of their respective colour image pixels wherein further analysis determines a negative second correlation value.
Figure 8B:
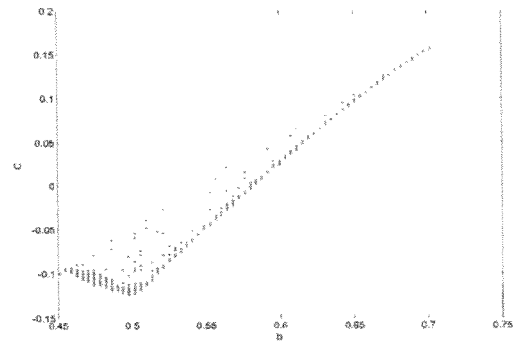
FIG. 8(b) shows second chromatic components of colour image pixels in FIG. 6(a) plotted against the first principal chromatic components of their respective colour image pixels wherein further analysis determines a positive third correlation value.
Figure 8C:
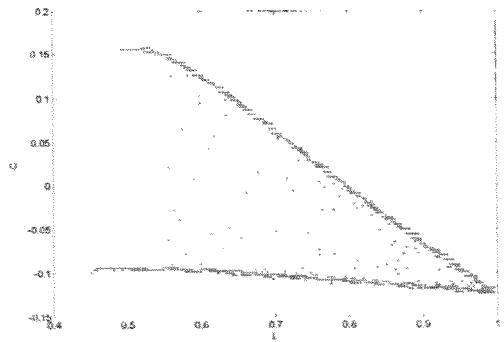
FIG. 8(c) shows luminance components of colour image pixels in FIG. 6(a) plotted against the first principal chromatic components of their respective colour image pixels wherein further analysis determines a negative first correlation value.

FIG. 8(a) shows the first chromatic components plotted against the respective first principal chromatic components of colour image pixels defining the colour image in FIG. 6(a). FIG. 8(b) depicts the second chromatic components plotted against the respective first principal chromatic components of colour image pixels defining the colour image in FIG. 6(a). FIG. 8(c) shows the first principal chromatic components plotted against the respective luminance values of the colour image pixels defining the colour image in FIG. 6(a). A determination of the first, second and third correlation values indicates that the first and third correlation values are negative. That is both the luminance components and first chromatic components of colour image pixels negatively correlate with the first principal chromatic components of the colour image. However, it is determined that the second correlation value indicative of a correlation between the second chromatic component and the first principal chromatic components of the colour image pixels, is positive.

Accordingly, as at least one of the first, second and third correlation values is positive, the grayscale image pixels have been properly assigned grayscale values based upon the addition of the luminance component and principal chromatic component of their corresponding colour image pixels. FIG. 6(e) shows a grayscale image which has been properly generated using the modified CLPC algorithm steps indicated in the flowchart of FIG. 1(b). In effect, FIG. 6(e) is the combination of data comprising FIG. 6(b) and FIG. 6(c)).

In contrast to the grayscale images shown in FIGS. 6(c) and 6(d) generated by the pre-existing conversion algorithms, the absolute difference in grayscale values between the numbers "2" and "5" and the background is 143. In this case, because at least the first chromatic components of colour image pixels in FIG. 6(a) are positively correlated with the first principal chromatic components of the pixels in FIG. 6(a), in converting the colour image of FIG. 6(a) into the grayscale image of FIG. 6(e), the CLPC algorithm has assigned grayscale values to the grayscale image pixels by adding the first principal chromatic components of the corresponding colour image pixels with the luminance values of the corresponding colour image pixels.

For illustrative purposes only FIG. 6(f) shows a grayscale image in which the grayscale image pixel values are based upon the luminance components minus the first principal chromatic components of the corresponding colour image pixels (i.e. the combination of data comprising FIG. 6(b) and FIG. 6(d)). The relatively poor contrast in FIG. 6(f) confirms that the grayscale image of FIG. 6(e) is the correct option adopted by the CLPC embodiment when generating the grayscale image given that at least one of the correlation values was determined to be positive.

EXAMPLE II

Figure 9A:
FIG. 9(a) shows a third exemplary colour image.
Figure 9B:
FIG. 9(b) shows an image generated based upon only the luminance components of the colour image pixels in FIG. 9(a)
Figure 9C:
FIG. 9(c) shows an image generated based upon only the $C_i$ of the colour image pixels of FIG. 9(a)
Figure 9D:
FIG. 9(d) shows an image generated based upon only the $-C_i$ of the colour image pixels of FIG. 9(a)
Figure 9E:
FIG. 9(e) shows a grayscale image generated in accordance with the first embodiment in which the grayscale image pixel values are based on the addition of the luminance components and first principal chromatic components of their corresponding colour image pixels, in view of a finding of a positive correlation between the luminance components and first principal chromatic components of the colour image pixels in FIG. 6(a)

The CLPC algorithm was further applied to the exemplary colour image shown in FIG. 9(a) to provide the resulting grayscale image shown in FIG. 9(e).

In performing the conversion, the CLPC algorithm calculates the $\{L_i^*\}$ and $(a_i^*, b_i^*)$ in a CIELAB colour space from RGB components, and a correlation matrix for computing first principal chromatic components. In total, $O(\eta^2)$ operations are approximately required to process a colour image of size $\eta \times \eta$ in accordance with the CLPC algorithm. It would be readily appreciated by a person skilled in the art that this is a practicable processing time in the context of real-time printing.

FIG. 9(f) shows a comparative table indicating the results of the CLPC, C2GB0-1 and Decolorize algorithms in converting the colour image into a grayscale image. The table shows that the grayscale values of specific regions in each of the resulting grayscale images together with an indication of the relative differences in grayscale values in specific regions of the resulting grayscale images.

Notably, the table in FIG. 9(f) shows grayscale values of specific objects in the resulting grayscale images—that is, "Red Fruit 1" (relatively dark) identified in FIG. 9(a) by the left-hand arrow, "Green Leaf" identified by the middle arrow, and "Red Fruit 2" (relatively bright) identified by the right arrow.

It would be understood by a person skilled in the art that a desirable performance characteristic of a colour to grayscale conversion algorithm is that the relative difference between two similar objects (in this example, the two fruits referred to as "Red Fruit 1" and "Red Fruit 2") should not be greater than their respective relative differences with a third object—that is, the "Green Leaf". In this regard, it is noted that the image of the two fruits, when converted by the C2GB0-1 algorithm and the Decolorize algorithm (FIGS. 9(c) and 9(d) respectively) exhibit relatively disparate grayscale values for each fruit (i.e. in each resulting grayscale image, one fruit is almost black whilst the other is close to white). However, in the resulting grayscale image of FIG. 9(e) which has been generated in accordance with the CLPC algorithm, the fruits both exhibit grayscale values which appear relatively consistent with one another.

It is apparent from the table in FIG. 9(f) that the "Red Fruit 1" object has a gray value of close to 255 whilst the "Red Fruit 2" object has a gray value of close to 111 as a result of both the C2GB0-1 and Decolorize algorithms which is the reason why the fruits in each of the resulting grayscale images for these conversion methods appear to be relatively disparate. Moreover, the table of FIG. 9(f) also reveals that the CLPC algorithm advantageously provides a more pronounced difference between gray values for each of the fruits and the green leaf which is not as readily evident by use of the C2GB0-1 and Decolorize algorithms.

EXAMPLE III

Figure 10A:
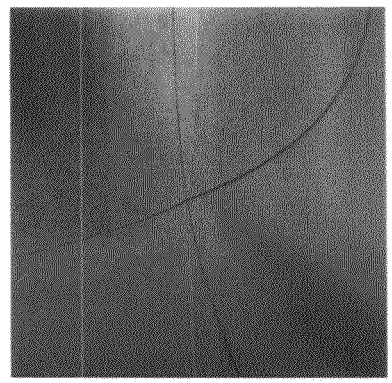
FIG. 10(a) shows a fourth exemplary colour image.

Further tests of the first embodiment algorithm have been applied to the computer-generated image shown in FIG. 10(a). The colour image contains many different colours and it would be difficult for the converted grayscale image to preserve all the colour contrasts. Moreover, there are three coloured lines in different colours (red, green and blue) in which colours change smoothly in their corresponding regions.

Figure 10B:
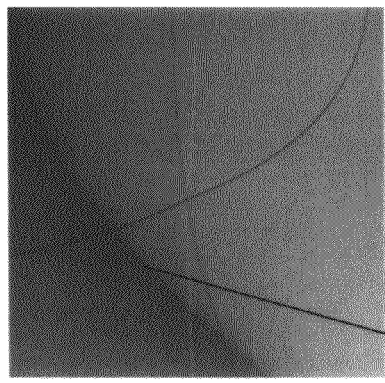
FIG. 10(b) shows an image generated based upon only the luminance components of the colour image pixels in FIG. 11(a) in which an undesirable pronounced edge artefact is readily apparent.
Figure 10C:
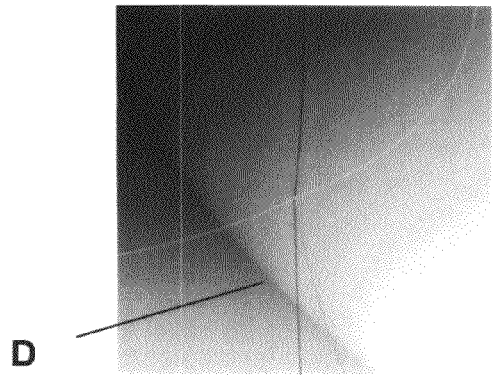
FIG. 10(c) shows an image generated by the pre-existing C2GB0-1 conversion algorithm in which the edge artefact is retained.
Figure 10D:
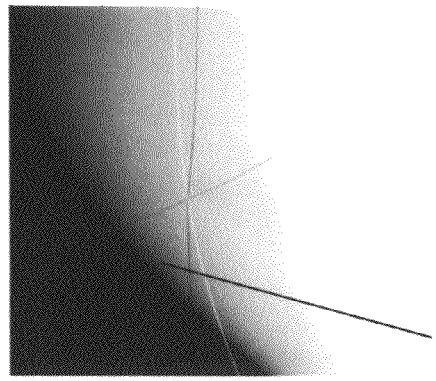
FIG. 10(d) shows an image generated by the pre-existing Decolorize conversion algorithm in which the edge artefact is retained.

FIG. 10(b) shows only the luminance values of pixels in the colour image of FIG. 10(a) resulting in a pronounced edge artefact indicated by "D". Moreover, it is apparent from an examination of the resulting grayscale images in FIGS. 10(c) and 10(d) produced by C2GB0-1 and Decolorize algorithms respectively, that they tend to retain, if not enhance, this artefact.

Figure 10E:
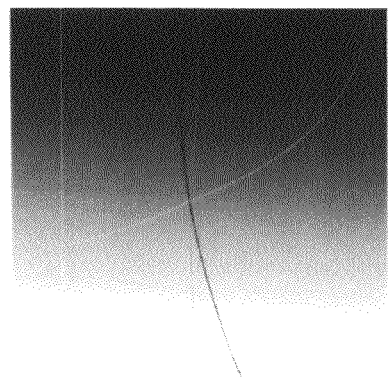
FIG. 10(e) shows a grayscale image generated in accordance with the first embodiment CLPC conversion algorithm in which there is relatively improved contrast without the presence of the image artefact.

In contrast, FIG. 10(e) which represents the resulting grayscale image produced by converting the colour image in FIG. 10(a) using the CLPC algorithm, shows more gradual changes in gray scale values. This shows that the transformation utilised by the first embodiment is continuous to an input colour variation.

In view of the above, it would be apparent that embodiments of the present invention provides at least one of the advantages of being more efficient and printer-friendly than the other conversion algorithms, as well as representing in a grayscale image, contrasts between isoluminant regions of the originating colour image.

Those skilled in the art will appreciate that the invention described herein is susceptible to variations and modifications other than those specifically described without departing from the scope of the invention. All such variations and modification which become apparent to persons skilled in the art, should be considered to fall within the spirit and scope of the invention as broadly hereinbefore described. It is to be understood that the invention includes all such variations and modifications. The invention also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed is:

1. A method for use in converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, the method including the steps of:
   (i) determining a principal chromatic component of each of the colour image regions by reference to the two-dimensional chromatic information associated with each of the colour image regions;
   (ii) determining a first correlation value indicative of a correlation between the principal chromatic components of the colour image regions and the luminance informations of the colour image regions; and
   (iii) generating the grayscale image data by reference to the first correlation value, wherein:
      (a) if the first correlation value is equal to or greater than zero, a grayscale value is generated for each grayscale image region by adding the principal chromatic component to the luminance information associated with the corresponding colour image region; and
      (b) if the first correlation value is less than zero, a grayscale value is generated for each grayscale image region by subtracting the principal chromatic component from the luminance information associated with the corresponding colour image region.

2. A method as claimed in claim 1 wherein the luminance information and two-dimensional chromatic information associated with each of the colour image regions are represented in accordance with the CIELAB colour space standard.

3. A method as claimed in claim 1 wherein the principal chromatic component of each colour image region includes the first principal chromatic component of each colour image region.

4. A method as claimed in claim 1 wherein the step of determining the principal chromatic components of the colour image regions includes applying a linear transformation to first and second chromatic components of the two-dimensional chromatic information of each of the colour regions.

5. A method as claimed in claim 4 wherein the first principal component $C_i$ is determined from the two dimensional chromatic information of each colour image region based on the following equation:

$$C_i = \alpha_1 a_i^* + \alpha_2 b_i^*,$$

where $(a_i^*, b_i^*)$ represents the pair of the first and second chromatic components of the colour image data, and $\alpha_1^2 + \alpha_2^2 = 1$.

6. A method as claimed in claim 1 including a further step of normalising the grayscale image data.

7. A computerised device for converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, wherein the device includes a processor and a memory store, said memory store being adapted to store a program executable by the processor so as to perform the following method steps:
   (i) determining a principal chromatic component of each of the colour image regions by reference to the two-dimensional chromatic information associated with each of the colour image regions;
   (ii) determining a first correlation value indicative of a correlation between the principal chromatic components of the colour image regions and the luminance informations of the colour image regions; and
   (iii) generating the grayscale image data by reference to the first correlation value, wherein:
      (a) if the first correlation value is equal to or greater than zero, a grayscale value is generated for each grayscale image region by adding the principal chromatic component to the luminance information associated with the corresponding colour image region; and
      (b) if the first correlation value is less than zero, a grayscale value is generated for each grayscale image region by subtracting the principal chromatic component from the luminance information associated with the corresponding colour image region.

8. A computerised device as claimed in claim 7 at least one of a printer, a personal computer, a PDA, a USB device, a dongle, a photocopier, a scanner, a facsimile machine, and a combination thereof.

9. A non-transitory computer-readable medium adapted for storing a computer program executable by a computerised system so as to perform the method steps in accordance with claim 1.

10. A method for use in converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, the method including the steps of:
   (i) determining a principal chromatic component of each of the colour image regions by reference to the two-dimensional chromatic information associated with each of the colour image regions;
   (ii) determining a first correlation value indicative of a correlation between the principal chromatic components of the colour image regions and the luminance informations of the colour image regions;
   (iii) determining a second correlation value indicative of a correlation between the principal chromatic components of the colour image regions and the first chromatic components of the two dimensional chromatic informations of the colour image regions;
   (iv) determining a third correlation value indicative of a correlation between the principal chromatic components of the colour image regions and the second chromatic components of the two dimensional chromatic informations of the colour image regions; and
   (v) generating the grayscale image data by reference to the first correlation value, wherein:
      (a) if at least one of the first, second, and third correlation values is equal to or greater than zero, a grayscale value is generated for each grayscale image region by adding the principal chromatic component to the luminance information associated with the corresponding colour image region; and
      (b) if all of the first, second and third correlation values are less than zero, a grayscale value is generated for each grayscale image region by subtracting the principal chromatic component from the luminance information associated with the corresponding colour image region.

11. A computerised device for converting a colour image data indicative of a plurality of colour image regions defining a two-dimensional colour image, into a grayscale image data indicative of a plurality of grayscale image regions defining a two-dimensional grayscale image, each of the colour image regions corresponding to one of the grayscale image regions, and wherein a luminance information and a two-dimensional chromatic information is associated with each of the colour image regions, wherein the device includes a processor and a memory store, said memory store being adapted to store a program executable by the processor so as to perform the following method steps:
   (i) determining a principal chromatic component of each of the colour image regions by reference to the two-dimensional chromatic information associated with each of the colour image regions;
   (ii) determining a first correlation value indicative of a correlation between the principal chromatic components of the colour image regions and the luminance informations of the colour image regions;
   (iii) determining a second correlation value indicative of a correlation between the principal chromatic components of the colour image regions and the first chromatic components of the two dimensional chromatic informations of the colour image regions;
   (iv) determining a third correlation value indicative of a correlation between the principal chromatic components of the colour image regions and the second chromatic components of the two dimensional chromatic informations of the colour image regions; and
   (v) generating the grayscale image data by reference to the first, second and third correlation value, wherein:
      (a) if at least one of the first, second, and third correlation values is equal to or greater than zero, a grayscale value is generated for each grayscale image region by adding the principal chromatic component to the luminance information associated with the corresponding colour image region; and
      (b) if all of the first, second and third correlation values are less than zero, a grayscale value is generated for each grayscale image region by subtracting the principal chromatic component from the luminance information associated with the corresponding colour image region.

12. A method as claimed in claim 2 wherein the principal chromatic component of each colour image region includes the first principal chromatic component of each colour image region.

13. A method as claimed in claim 2 wherein the step of determining the principal chromatic components of the colour image regions includes applying a linear transformation to first and second chromatic components of the two-dimensional chromatic information of each of the colour regions.

14. A method as claimed in claim 3 wherein the step of determining the principal chromatic components of the colour image regions includes applying a linear transformation to first and second chromatic components of the two-dimensional chromatic information of each of the colour regions.

* * * * *